(12) United States Patent
Liu et al.

(10) Patent No.: US 10,965,433 B2
(45) Date of Patent: Mar. 30, 2021

(54) SWITCHING OF BANDWIDTH PARTS IN WIRELESS COMMUNICATION NETWORK

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 16/333,666

(22) PCT Filed: Sep. 28, 2018

(86) PCT No.: PCT/CN2018/108397
§ 371 (c)(1),
(2) Date: Mar. 15, 2019

(87) PCT Pub. No.: WO2019/062867
PCT Pub. Date: Apr. 4, 2019

(65) Prior Publication Data
US 2020/0274676 A1    Aug. 27, 2020

(30) Foreign Application Priority Data
Sep. 28, 2017 (WO) .............. PCT/CN2017/104009

(51) Int. Cl.
*H04W 72/04* (2009.01)
*H04L 5/00* (2006.01)
(Continued)

(52) U.S. Cl.
CPC .......... *H04L 5/0092* (2013.01); *H04L 1/1819* (2013.01); *H04L 5/0055* (2013.01);
(Continued)

(58) Field of Classification Search
CPC ......... H04W 52/0216; H04W 72/0413; H04W 72/0453; H04W 80/02; H04L 5/0092; H04L 1/1819; H04L 5/0055
See application file for complete search history.

(56) References Cited

U.S. PATENT DOCUMENTS

2018/0270700 A1*   9/2018   Babaei .............. H04W 72/0453
2018/0324773 A1*   11/2018   Fu .......................... H04L 5/0082
(Continued)

FOREIGN PATENT DOCUMENTS

CN    102244559 A    11/2011
CN    105099634 A    11/2015

OTHER PUBLICATIONS

"Procedures for UL Transmissions", 3GPP TSG RAN WG1 Meeting NR#3; R1-1716007; Nagoya, Japan, Sep. 18-21, 2017, pp. 1-4.
(Continued)

*Primary Examiner* — Chi Ho A Lee
(74) *Attorney, Agent, or Firm* — Murphy, Bilak & Homiller, PLLC

(57) ABSTRACT

The present disclosure relates to switching of bandwidth parts in wireless communication network. Embodiments may provide a method performed by a wireless device for switching of bandwidth parts. The method comprises: receiving (1501) a first message from a base station indicating a first physical uplink control channel; receiving (1502) a second message from the base station indicating switching from a first bandwidth part to a second bandwidth part; in response to the second message, switching (1504) to the second bandwidth part for communication with the base station, with a utilization of the first physical uplink control channel A radio resource, such as a physical uplink control channel may be allocated previously to the wireless device,
(Continued)

thus, service interruptions for the wireless device during the switch of bandwidth part may be reduced.

20 Claims, 16 Drawing Sheets

(51) Int. Cl.
    *H04L 1/18*     (2006.01)
    *H04W 52/02*     (2009.01)
    *H04W 80/02*     (2009.01)

(52) U.S. Cl.
    CPC ... *H04W 52/0206* (2013.01); *H04W 52/0216* (2013.01); *H04W 72/0413* (2013.01); *H04W 72/0453* (2013.01); *H04W 80/02* (2013.01)

(56) References Cited

U.S. PATENT DOCUMENTS

| | | | |
|---|---|---|---|
| 2019/0044689 A1* | 2/2019 | Yiu | H04L 5/0098 |
| 2019/0045489 A1* | 2/2019 | He | H04L 1/1812 |
| 2019/0075585 A1* | 3/2019 | Deogun | H04L 5/0092 |
| 2019/0090299 A1* | 3/2019 | Ang | H04L 5/0053 |
| 2019/0098655 A1* | 3/2019 | Shih | H04B 7/0617 |
| 2019/0364602 A1* | 11/2019 | Yi | H04W 74/0833 |
| 2020/0037260 A1* | 1/2020 | Fu | H04W 52/325 |
| 2020/0119895 A1* | 4/2020 | Choi | H04L 5/00 |
| 2020/0177424 A1* | 6/2020 | Noh | H04L 5/00 |

OTHER PUBLICATIONS

"Summary of Offline Discussion on Bandwidth Part Operation", 3GPP TSG RAN WG1 Meeting NR#3; R1-1716832; Nagoya, Japan, Sep. 18-21, 2017, pp. 1-8.

"3GPP TS 36.321 V14.4.0", 3rd Generation Partnership Project; Technical Specification Group Radio Access Network; Evolved Universal Terrestrial Radio Access (E-UTRA); Medium Access Control (MAC) protocol specification (Release 14), Sep. 2017, pp. 1-108.

"Bandwidth part activation and adaptation", 3GPP TSG RAN WG1 Meeting NR Ad Hoc#3; R1-1715571; Nagoya, Japan, Sep. 18-21, 2017, pp. 1-5.

"On bandwidth adaptation", 3GPP TSG RAN WG1 NR Ad-Hoc Meeting; R1-1711424; Qingdao, China, Jun. 27-30, 2017, pp. 1-5.

"On LCH-to-SR-configuration mapping within the multi-BWP Framework", 3GPP TSG-RAN WG2 #99-Bis; R2-1710341; Prague, Czech Republic, Oct. 9-13, 2017, pp. 1-4.

"PUCCH resource configuration for bandwidth restricted UE", 3GPP TSG RAN WG1 NR#3; R1-1716003; Nagoya, Japan, Sep. 18-21, 2017, pp. 1-3.

"3GPP TS 36.331 V14.3.0", 3rd Generation Partnership Project; Technical Specification Group Radio Access Network; Evolved Universal Terrestrial Radio Access (E-UTRA); Radio Resource Control (RRC); Protocol specification (Release 14), Jun. 2017, pp. 1-745.

* cited by examiner

SWITCHING OF BANDWIDTH PARTS IN WIRELESS COMMUNICATION NETWORK

TECHNICAL FIELD

The present disclosure relates generally to the technology of wireless communication, and in particular, to switching of bandwidth parts in a wireless communication network.

BACKGROUND

As the improvement of the communication technology, a carrier wave with much wider bandwidth is used between a base station (such as a gNB in a 5G network) and a wireless device, so as to improve the data transmission speed and the performance for serving numerous users.

However, it will be power consuming if the wireless device needs to monitor the full bandwidth for control channels (e.g., CORESET) all the time, and there may also be some types of wireless devices which only support a relatively narrow bandwidth. Thus, a carrier bandwidth may be divided to a plurality of bandwidth parts (BWP) with relatively narrow frequency ranges. A bandwidth part may be allocated for the wireless device to communicate with the base station. Communication within a bandwidth part will enables power saving for the wireless device since the wireless device doesn't need to monitor the full bandwidth. Further, radio resource management for the network across the wide bandwidth will be more efficient.

There currently exist certain challenges using bandwidth parts. For example, when the wireless device is indicated to switch from a source bandwidth part (BWP) to a target bandwidth part, the wireless device may have to completely interrupt the communication with the base station, refine its synchronization to the network and wait for a new radio resource. Such interruptions will be time consuming.

SUMMARY

Certain aspects of the present disclosure and their embodiments may provide solutions to these or other challenges. There are, proposed herein, various embodiments which address one or more of the issues disclosed herein.

A first aspect of embodiments may provide a method performed by a wireless device for switching of bandwidth parts. The method comprises: receiving a first message from a base station indicating a first physical uplink control channel; receiving a second message from the base station indicating switching from a first bandwidth part to a second bandwidth part; in response to the second message, switching to the second bandwidth part for communication with the base station, with a utilization of the first physical uplink control channel.

In embodiments of the present disclosure, wherein the utilization of the first physical uplink control channel may comprise: sending a third message to the base station through the first physical uplink control channel. The third message may comprise at least one of a scheduling request, a hybrid automatic repeat request acknowledge/negative acknowledge, and a channel station information.

In embodiments of the present disclosure, the first physical uplink control channel may be allocated within a third bandwidth part. The method may further comprise receiving a fourth message from the base station indicating a second physical uplink control channel allocated within the second bandwidth part.

In embodiments of the present disclosure, the third bandwidth part may further be configured for a random access channel for the wireless device.

In embodiments of the present disclosure, the third bandwidth part may further be configured for a physical downlink control channel.

In embodiments of the present disclosure, the method may further comprise receiving a fifth message from the base station comprising a value of a timer, which indicates the usage time of the first physical uplink control channel; and stopping using the first physical uplink control channel, in response to an expiration of the timer.

In embodiments of the present disclosure, the method may further comprise sending a sixth message reporting a stop of using the first physical uplink control channel.

In embodiments of the present disclosure, the first physical uplink control channel may be allocated within the second bandwidth part.

In embodiments of the present disclosure, a logical channel of the wireless device may be mapped to both a physical uplink control channel within the first bandwidth part and the first physical uplink control channel within the second bandwidth part. The wireless device may use the first physical uplink control channel without remapping of the logical channel.

In embodiments of the present disclosure, the logical channel of the wireless device may be mapped to a plurality of physical uplink control channels respectively allocated in a plurality of bandwidth parts.

In embodiments of the present disclosure, a logical channel of the wireless device may be mapped to a physical uplink control channel within the first bandwidth part. The wireless device may use the first physical uplink control channel with remapping of the logical channel to the first physical uplink control channel within the second bandwidth part.

In embodiments of the present disclosure, the first message may comprise at least one of a radio resource control signaling, a medium access control control element, and a physical downlink control channel order.

In embodiments of the present disclosure, the method may further comprise sending a seventh message to the base station confirming the result of the switch of bandwidth part.

In embodiments of the present disclosure, the method may further comprise receiving an eighth message indicating a time point or a time period to send the third message.

In embodiments of the present disclosure, the method may further comprise sending the third message after performing a radio frequency tuning.

In embodiments of the present disclosure, the method may further comprise sending a ninth message to the base station for requiring the switch of bandwidth part.

A second aspect of embodiments may provide a method performed by a base station for switching of bandwidth parts. The method comprises: determining switching from a first bandwidth part to a second bandwidth part for a wireless device; sending a first message to the wireless device indicating a first physical uplink control channel; sending a second message to the wireless device indicating the switch from the first bandwidth part to the second bandwidth part; switching the wireless device from the first bandwidth part to the second bandwidth part for communication with the wireless device, with a utilization of the first physical uplink control channel.

In embodiments of the present disclosure, wherein the utilization of the first physical uplink control channel may comprise: receiving a third message from the wireless device through the first physical uplink control channel. The third message may comprise at least one of a scheduling request, a hybrid automatic repeat request acknowledge/negative acknowledge, and a channel station information.

In embodiments of the present disclosure, the first physical uplink control channel may be allocated within a third bandwidth part. The method may further comprise sending a fourth message to the wireless device indicating a second physical uplink control channel allocated within the second bandwidth part.

In embodiments of the present disclosure, the third bandwidth part may be further configured for a random access channel for the wireless device.

In embodiments of the present disclosure, the third bandwidth part is further configured for a physical downlink control channel.

A third aspect of embodiments may provide a wireless device for switching of bandwidth parts. The wireless device comprises: processing circuitry configured to perform any of the steps of the above mentioned method.

A fourth aspect of embodiments may provide a base station for switching of bandwidth parts. The base station comprises: processing circuitry configured to perform any of the steps of the above mentioned method.

A fifth aspect of embodiments may provide a device readable medium having a computer program stored thereon. The computer program is executable by a device to cause the device to carry out the method according to any one of method above mentioned.

A sixth aspect of embodiments may provide a user equipment (UE) for switching of bandwidth parts. The UE comprises: an antenna configured to send and receive wireless signals; radio front-end circuitry connected to the antenna and to processing circuitry, and configured to condition signals communicated between the antenna and the processing circuitry; the processing circuitry being configured to perform any of the steps of the above mentioned method; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

A seventh aspect of embodiments may provide a communication system including a host computer comprising: processing circuitry configured to provide user data; and a communication interface configured to forward the user data to a cellular network for transmission to a user equipment (UE). The cellular network comprises a base station having a radio interface and processing circuitry, the base station's processing circuitry configured to perform any of the steps of the above mentioned methods.

In conclusion, the base station may be configured to allocate a radio resource, such as physical uplink control channel to the wireless device, when switching of bandwidth parts for the wireless device is determined. For example, a backup radio resource may be allocated for service during the switch of bandwidth part, or new radio resource in the target bandwidth part may be allocated previously. Thus, these embodiments may provide the technical advantage that service interruptions for the wireless device during the switch of bandwidth part may be reduced.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
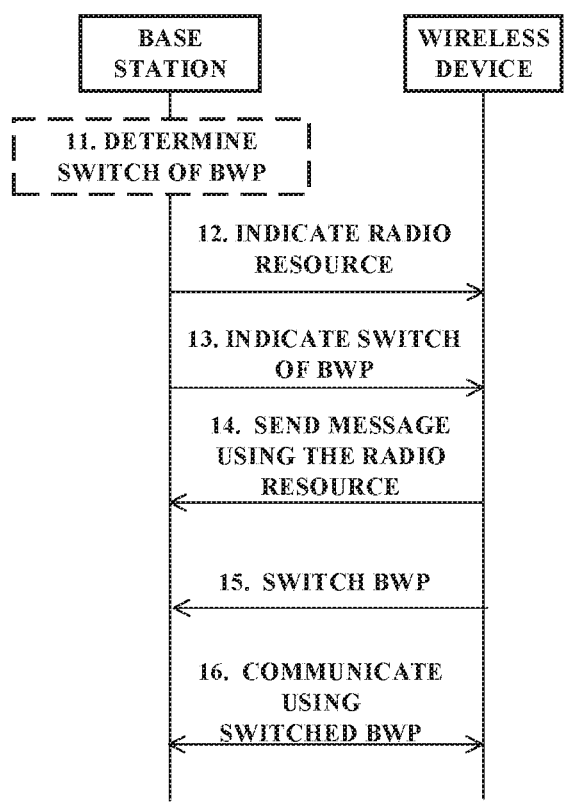
FIG. 1 is a schematic showing a procedure for switching of bandwidth in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some references will be introduced first for the purpose of better understanding the present disclosure, without limitation.

See documents published by the 3GPP meeting RAN1 #90, concept of Bandwidth Part (BWP) is introduced. The concept of BWP is being under discussed in RAN1, serving two purposes: on one hand, it enables power savings at the UE since the UE doesn't need to monitor the full bandwidth for control channels (e.g., CORESET) all the time and on the other hand, it gives means for the network to manage an efficient radio resource management across the wide bandwidth via change of center frequency.

From RAN1 #90, there are agreements regarding the signaling means for activation/deactivation of BWPs are as below:
  There is an initial active DL/UL bandwidth part pair to be valid for a UE until the UE is explicitly (re)configured with bandwidth part(s) during or after RRC connection is established
    The initial active DL/UL bandwidth part is confined within the UE minimum bandwidth for the given frequency band
    FFS: details of initial active DL/UL bandwidth part are discussed in initial access agenda
  Support activation/deactivation of DL and UL bandwidth part by explicit indication at least in (FFS: scheduling) DCI
    FFS: In addition, MAC CE based approach is supported
  Support activation/deactivation of DL bandwidth part by means of timer for a UE to switch its active DL bandwidth part to a default DL bandwidth part
    The default DL bandwidth part can be the initial active DL bandwidth part defined above
    FFS: The default DL bandwidth part can be reconfigured by the network
    FFS: detailed mechanism of timer-based solution (e.g. introducing a new timer or reusing DRX timer)
    FFS: other conditions to switch to default DL bandwidth part The development of the BWP concept is started for DL. In RAN1 #90, RAN1 has made a solid progress on the single UL active BWP case, and it is FFS for multiple active UL BWPs.

For instance, 3GPP meeting RAN2 has made below agreements up to now for single BWP case.
  1. For the single-cell case, one single LCH is mapped to none or one SR configuration per BWP.
  2. sr-ProhibitTimer is independently configured per SR configuration.
  3. drs-TransMax is independently configured per SR configuration.

See 3GPP TS 36.321 V14.4.0 (2017 September), BSR and SR Framework in LTE are introduced.

When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or when the UL grant(s) can accommodate all pending data available for transmission.

If an SR is triggered and there is no other SR pending, the MAC entity shall set the SR_COUNTER to 0.

As long as one SR is pending, the MAC entity shall for each TTI:
  if no UL-SCH resources are available for a transmission in this TTI:
    if the MAC entity has no valid PUCCH resource for SR configured in any TTI and if rach-Skip for the MCG MAC entity or rach-SkipSCG for the SCG MAC entity is not configured: initiate a Random Access procedure (see subclause 5.1) on the SpCell and cancel all pending SRs;
    if SR_COUNTER<:
    increment SR_COUNTER by 1;
    instruct the physical layer to signal the SR on one valid PUCCH resource for SR;
    start the sr-ProhibitTimer.
    else:
    notify RRC to release PUCCH for all serving cells;
    notify RRC to release SRS for all serving cells;
    clear any configured downlink assignments and uplink grants;
    initiate a Random Access procedure (see subclause 5.1) on the SpCell and cancel all pending SRs.

As a summary, the D-SR is repeatedly transmitted on consecutive SR opportunities on PUCCH until the UE receives an UL grant on PDCCH. The transmission is stopped at least when PUCCH resources are released and/or UL synch is lost even if the UE has not received any UL grant on PDCCH. After stopping transmission on the D-SR, the UE transmits on the RA-SR (i.e. accesses the system via RACH). In this case the UE already has a valid C-RNTI, the UE would include C-RNTI in message 3 for contention resolution purpose. Upon reception of message 3, the network then assigns dedicated SR resource/configuration for the UE via RRC signaling message without reestablishment of the RRC connection.

See 3GPP TS 36.331 V14.3.0 (2017 June), details of SR configuration are introduced.

In LTE, each SR configuration carries the information as below:

```
SchedulingRequestConfig ::= CHOICE {
    release NULL,
    setup SEQUENCE {
        sr-PUCCH-ResourceIndex INTEGER (0..2047),
        sr-ConfigIndex INTEGER (0..157),
        dsr-TransMax ENUMERATED {
            n4, n8, n16, n32, n64, spare3, spare2, spare1}
    }
}
```

Where each SR configuration contains
  1) one sr-PUCCH-ResourceIndex, which identifies the PUCCH resource location, 2) sr-ConfigIndex, which is used to determine the subframe where SR shall be transmitted based on following table and formula.

<36.213 Table 10.1.5-1: UE-specific SR periodicity and subframe offset configuration>

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

UE can transmit SR at there subframe where following condition is met.

$$(10 \times n_f + \lfloor n_s/2 \rfloor - N_{OFFSET,SR}) \bmod SR_{PERIODICITY} = 0$$

dsr-TransMax: Maximum number of SR transmission count (See 36.321 5.4.4 Scheduling Request).

As below, embodiments of the present disclosure will be described with figures.

FIG. 1 is a schematic showing a procedure for switching of bandwidth in accordance with some embodiments. In FIG. 1, a procedure for switching of bandwidth parts (BWP) in accordance with some embodiments is shown. In step 11, the base station determines switching of BWP, such as from a first bandwidth part to a second bandwidth part for the wireless device. In step 12, the base station sends a first message to the wireless device indicating a radio resource, such as a first physical uplink control channel, and the wireless device receives the first message. In step 13, the base station sends a second message to the wireless device indicating the switch from the first bandwidth part to the second bandwidth part, and the wireless device receives the second message. In step 14, the wireless device sends a third message through the first physical uplink control channel, and the base station receives the third message. The third message comprises at least one of a scheduling request, a hybrid automatic repeat request acknowledge/negative acknowledge, and a channel station information. In step 15, the wireless device switches to the second BWP, and the base station accepts it. In step 16, the base station communicate with the wireless device, using the switched BWP, namely, the second bandwidth part.

It should be appreciated that ordinal numbers, such as "first, second" and so on, are only used to illustrate the disclosure clearly, without limitation to any technical details, such as order, or priority. Particularly, different messages are only intended to distinguish different functions in different steps, without limitation to their specific type or format. In practice, different messages may refer to different types of signalling, or just refer to different part, such as information element, control element, in the same type of signalling.

During the switching of BWP, the base station may be configured to allocate a radio resource, such as the physical uplink control channel to the wireless device previously. Service interruptions for the wireless device during the switch of bandwidth part may be reduced.

Particularly, in step 14, the first physical uplink control channel is used to transmit the third message comprising at least one of a scheduling request, a hybrid automatic repeat request acknowledge/negative acknowledge, and a channel station information. The base station may manage the resources for the wireless device more efficiently based on the third message. Service interruptions for the wireless device during the switch of bandwidth part may be further reduced.

After the switching to the second bandwidth part, both uplink channel and downlink channel may be established in the second bandwidth part, especially for a high-end wireless device which is reciprocity capable. Such high-end wireless device may derive the transmission beam in uplink based on the received signal in downlink. The establishment of both uplink channel and downlink channel in the second BWP at the same time may shorten the preparation time for the data transmission.

As examples but not limitations, more details will be illustrated below in accordance with figures.

Example 1

As example 1, the first physical uplink control channel (PUCCH) is indicated by the first message in step 12 as a backup radio resource.

Figure 2:
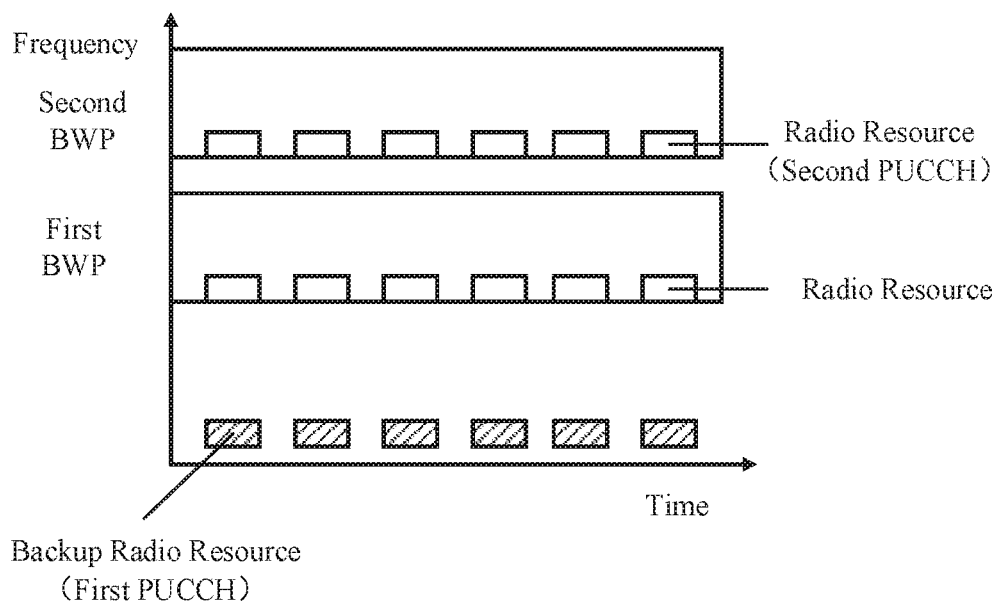
FIG. 2 is a schematic showing a configuration of a backup radio resource.

FIG. 2 is a schematic showing a configuration of a backup radio resource. See FIG. 2, the backup radio resource not belonging to the first and second BWP is shown. Further, the backup radio resource may not belong to any BWP, such that the backup radio resource is reserved for an efficient usage during the switch of BWP. With such configuration, the backup radio resource may be applicable for all logical channels (LCH). Thus, whenever the switch of BWP is determined, the backup radio resource may be allocated to the wireless device directly and timely.

In step 14, the wireless device starts to use the first PUCCH immediately to send the third message, since the backup radio resource is pre-allocated. With the backup radio resource, the base station keeps the communication with the wireless device, while allocating the radio resource in the second BWP. After the allocation is finished, the base station may send a fourth message indicating the radio resource allocated within the second bandwidth part. Specifically, the fourth message may indicate a second physical uplink control channel allocated within the second bandwidth part. Upon reception of the fourth message, the wireless device may start to use the second bandwidth part.

Thus, during the switch of BWP, the service interruptions for the wireless device during the switch of bandwidth part may be reduced, since a backup resource is pre-allocated.

Alternatively, the first physical uplink control channel may be allocated within a third BWP, to reduce extra cost of frequency range and management outside of configured BWPs. The third bandwidth part may be further configured for a random access channel for the wireless device. The third bandwidth part may be further configured for a physical downlink control channel, and particularly for control-resource set (CORESET). Further, for indicating the first physical uplink control channel, the first message may comprise at least one of a radio resource control (RRC) signalling, a medium access control control element (MAC CE), and a physical downlink control channel (PDCCH) order.

Additionally, the base station may enable a timer for the usage time of the first physical uplink control channel. The base station may send a fifth message comprising a value of the timer to the wireless device. The wireless device stops using the first physical uplink control channel, in response to an expiration of the timer. Optionally, the wireless device may send a sixth message to the base station reporting a stop of using the first physical uplink control channel.

The timer may be managed by the wireless device itself, to reduce the burden of the base station. With the timer, the efficiency of the usage of the first physical uplink control channel may be improved.

With the first physical uplink control channel (PUCCH), at least one of a scheduling request (SR), a hybrid automatic repeat request acknowledge/negative acknowledge (HARQ A/N), and a channel station information (CSI) may be transmitted. Particularly, the scheduling request (SR) may be sent, to request uplink share channel (UL-SCH) resources for data transmission.

See 3GPP TS 36.321 documents, such as 3GPP TS 36.321 V14.4.0 (2017 September), a framework for buffer status reporting is specified. Buffer status reporting (BSR) is used by the user equipment (UE) to report to the state station, such as evolved node B (eNB), the amount of data stored in its buffers for transmission. The eNB uses these reports to allocate resources to the UE, and to prioritize resource allocation between different UEs.

The UE triggers a Regular BSR when uplink data becomes available for transmission and this data belongs to a Logical Channel Group (LCG) (or radio bearer group) with higher priority than those for which data already existed in the buffer or if the UE buffers were empty just before this new data became available for transmission. If no uplink (UL) grant is available, a SR transmission will be triggered.

An SR is either sent on the random access channel (RACH) as an RA-SR or on a dedicated resource on PUCCH as a D-SR. A D-SR is typically used when the UE uplink is time synchronized. The purpose is to enable UE to rapidly request resources for uplink data transmission. In 3GPP, a dedicated solution for the scheduling request has been agreed. For the dedicated approach, each active user is assigned a dedicated channel for performing the scheduling request. The benefit with this method is that no UE ID has to be transmitted explicitly, since the UE is identified by the channel used. Furthermore, no intra-cell collisions will occur in contrast to the contention based approach.

With such configuration, when the scheduling request (SR) is sent through the dedicated first physical uplink control channel, the communication using the second BWP may be established faster, with less service interruptions.

Example 2

As example 2, the first physical uplink control channel (PUCCH) indicated by the first message in step 12 may be allocated within the second BWP.

Figure 3:
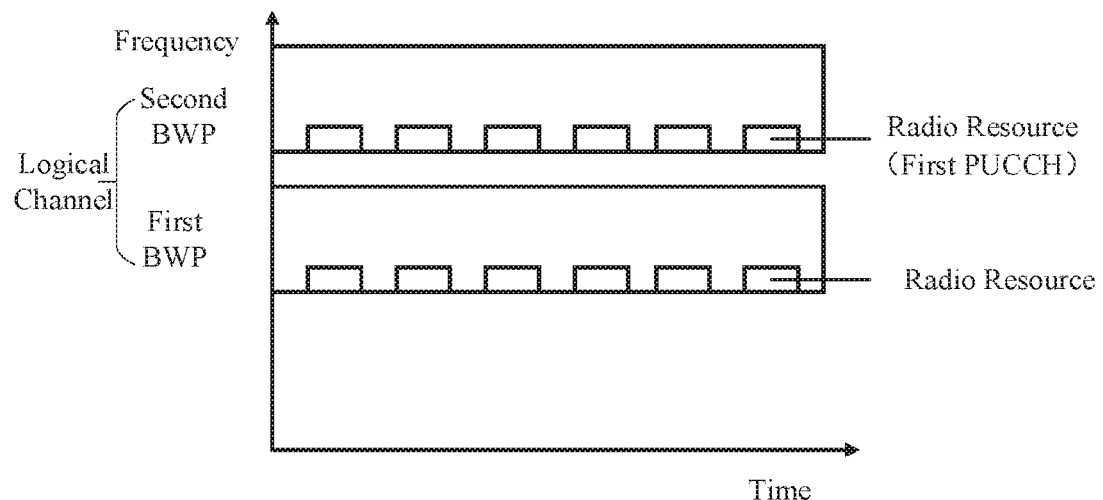
FIG. 3 is a schematic showing a configuration without the backup radio resource.

FIG. 3 is a schematic showing a configuration without the backup radio resource. In FIG. 3, a logical channel of the wireless device is mapped to both a physical uplink control channel within the first bandwidth part and the first physical uplink control channel within the second bandwidth part. The first BWP and the second BWP are active for the wireless device at the same time. Thus, a medium access control (MAC) entity of the wireless device may get the configuration of the first PUCCH directly. The wireless device may uses the first physical uplink control channel with in the second BWP, without remapping of the logical channel Thus, the service interruptions during switch of BWP may be further reduced.

In embodiments of the present disclosure, the first BWP and the second BWP are taken as examples to illustrate the switching process. However, they are not limitations. The logical channel may be associated with a plurality of BWPs, more than the first BWP, and the second BWP. In each BWP of the plurality of BWPs, there may be a PUCCH resource (or SR resource) allocated, such as the first physical uplink control channel. An SR configuration may consist of these PUCCH resources for SR across different BWPs. Further, one or more such SR configuration may be configured to the medium access control (MAC) entity of the wireless device. The first message may indicate such a SR configuration including information about the first physical uplink control channel. With such a configuration, a logical channel of the wireless device may be mapped to a plurality of physical uplink control channels respectively allocated in a plurality of bandwidth parts. The switching of BWPs in the plurality of bandwidth parts may be smoother.

The short PUCCH format comprises 1-2 symbols. However, if more time resources are available, a long PUCCH format can have a duration of 4 to 14 symbols. These two PUCCH formats are being discussed in 3GPP meeting RAN1. They can be applied for LCHs with different latency requirements separately. For example, the short PUCCH format is of high relevance for Ultra-Reliable and Low Latency Communications (URLLC) like services. With different configuration of the first physical uplink control channel, the method in the present disclosure may also applicable for different services.

Example 3

As example 3, the first physical uplink control channel (PUCCH) indicated by the first message in step 12 may also be allocated within the second BWP. However, PUCCHs within the first BWP and the second BWP are not mapped to the same logical channel.

Figure 4:
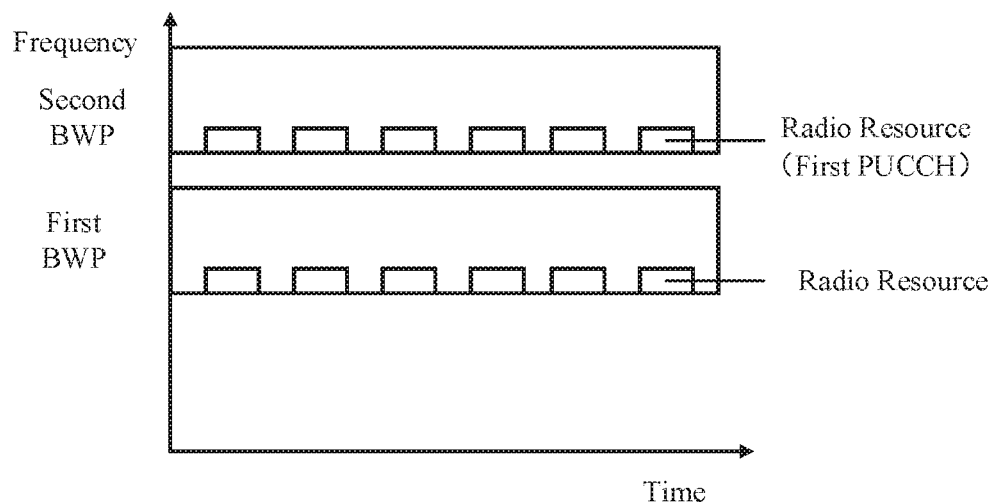
FIG. 4 is a schematic showing another configuration without the backup radio resource.

FIG. 4 is a schematic showing another configuration without the backup radio resource. In FIG. 4, only the first BWP is active for the wireless device firstly, and then the first BWP needs to be deactivated when the switch of the BWP starts. The base station performs the allocation of the radio resource in the second BWP, while the wireless device stops using the first BWP, so as to reduce the waiting time of the wireless device. After the allocation of the radio resource in the second BWP, the logical channel may be remapped to the first PPUCH within the second BWP. The remapping can be done via dedicated RRC signaling, or a new MAC CE, or a physical downlink control channel (PDCCH) command.

Example 4

As example 4, the first physical uplink control channel (PUCCH) indicated by the first message in step 12 may also be allocated within the second BWP, and the first BWP and the second BWP are not mapped to the same LCH. However, the base station allocates the radio resource, such as the first PUCCH, while retaining the usage of the first BWP.

Figure 5:
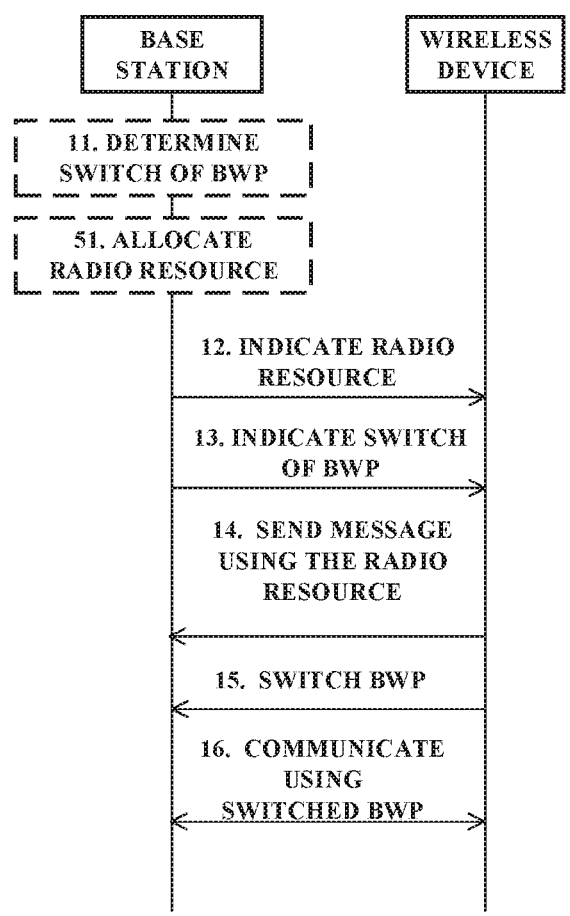
FIG. 5 is a schematic showing another procedure for switching of bandwidth in accordance with some embodiments.

FIG. 5 is a schematic showing another procedure for switching of bandwidth in accordance with some embodiments. Compared to FIG. 1, step 51 is added. See FIG. 5, in step 51, the base station allocates the radio resource, such as the first PUCCH, previously in the second BWP. Then, the base station may firstly performs step 12 to indicate the wireless device the radio resource, and then performs step 13 to indicate the wireless device to switch BWPs. After the performance of the step 13, the wireless device may start to use the second BWP soon in step 14, as in example 2. Thus, even without the backup radio resource, the service interruptions during switch of BWP may be further reduced.

Further, when the wireless device starts to use the second BWP, the wireless may send a seventh message to the base station confirming the result of the switching of bandwidth parts.

The base station may send an eighth message to the wireless device indicating a time point or a time period to send the third message, i.e., to start the switching of BWPs. The indication of the time for switching may improve the synchronization between the wireless device and the base station, so as to further reduce interruption. Optionally, the wireless device may decides the time by itself. For example, the wireless device may send the third message to try to start the switch right after performing a radio frequency (RF) tuning. Thus, the generated interruption due to RF tuning does not overlap with the transmission of the third message or other information. In such way, the transmission started by a UE is not impacted at all if the interruption due to RF tuning is shorter than the transmission interval. Service interruptions may be further reduced.

Above mentioned examples 1-4 are just illustrative and not limiting the present disclosure, they may be further defined or adjusted for different application circumstances.

For example, before the base station determines the switching of BWPs in step 11, the base station may collects measurement results on BWPs by itself as a basis for the determination. The measurement may include the number of users or the connection quality. Additionally or alternatively, the wireless device may provide measurement results for both the first BWP and the second BWP to the base station. The measurement results could be related to a specific BWP measurement event, such as service delay or transmission speed. The wireless device may send a ninth message to the base station for requiring the switching of bandwidth parts. The ninth message may include indicators/information element on whether a BWP switch should be triggered, and which is the preferred target BWP. The base station makes the final decision based on the message form the wireless device and/or the collected measurement results.

Figure 6:
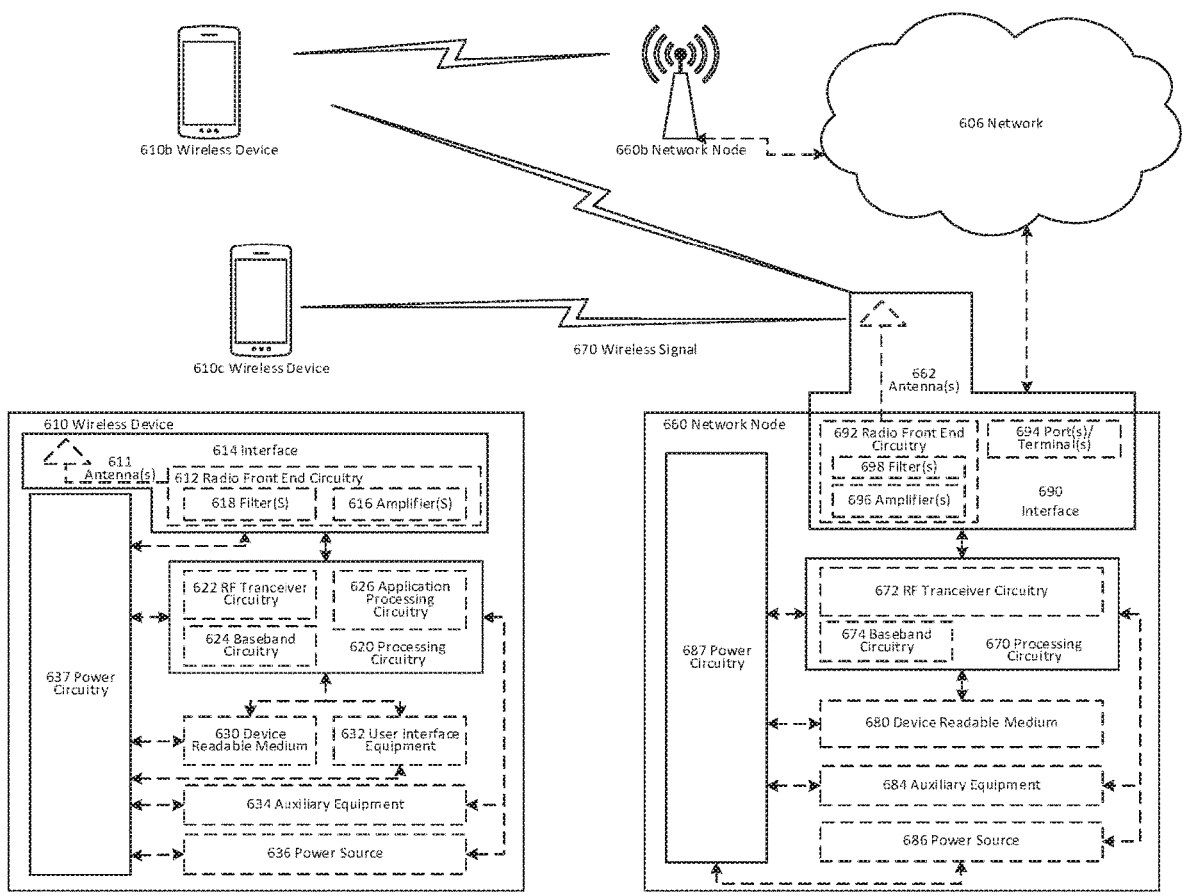
FIG. 6 is a schematic showing a wireless network in accordance with some embodiments.

FIG. 6 is a schematic showing a wireless network in accordance with some embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660*b*, and WDs 610, 610*b*, and 610*c*. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670, according to the above embodiments/examples of the present disclosure. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

In embodiments of the present disclosure, the device readable medium has a computer program stored thereon, wherein the computer program is executable by a device to cause the device to carry out the method above mentioned.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660.

For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
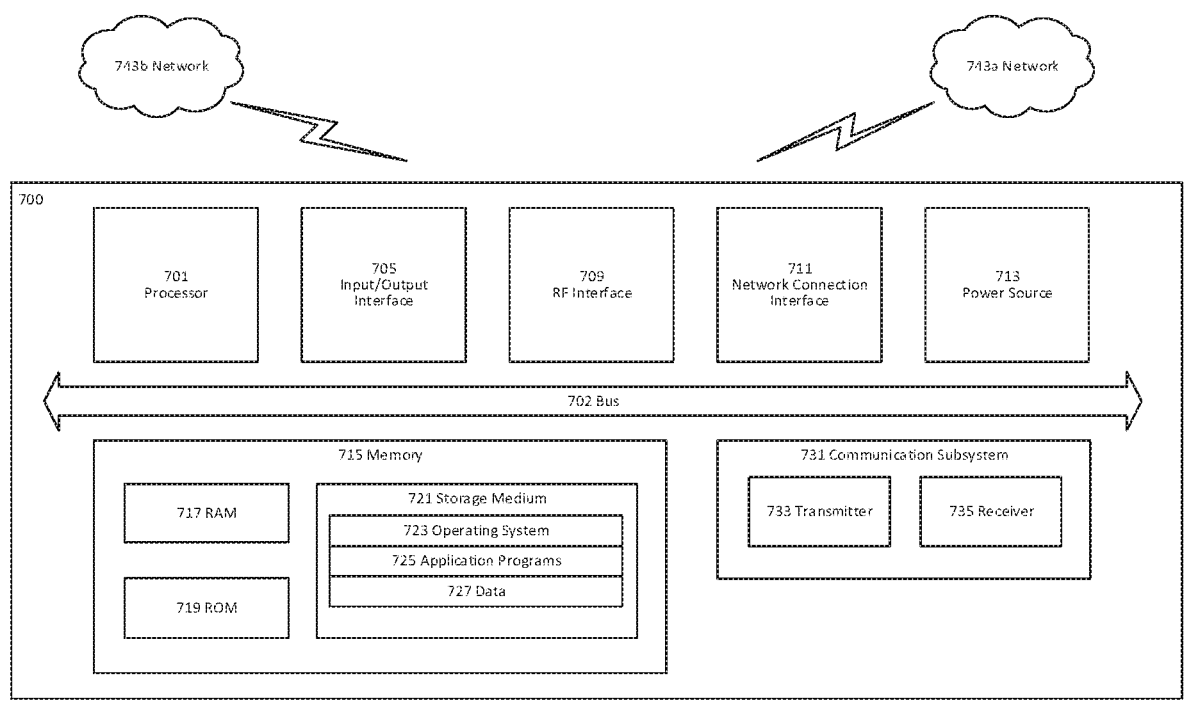
FIG. 7 is a schematic showing a User Equipment in accordance with some embodiments.

FIG. 7 is a schematic showing a User Equipment in accordance with some embodiments. FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
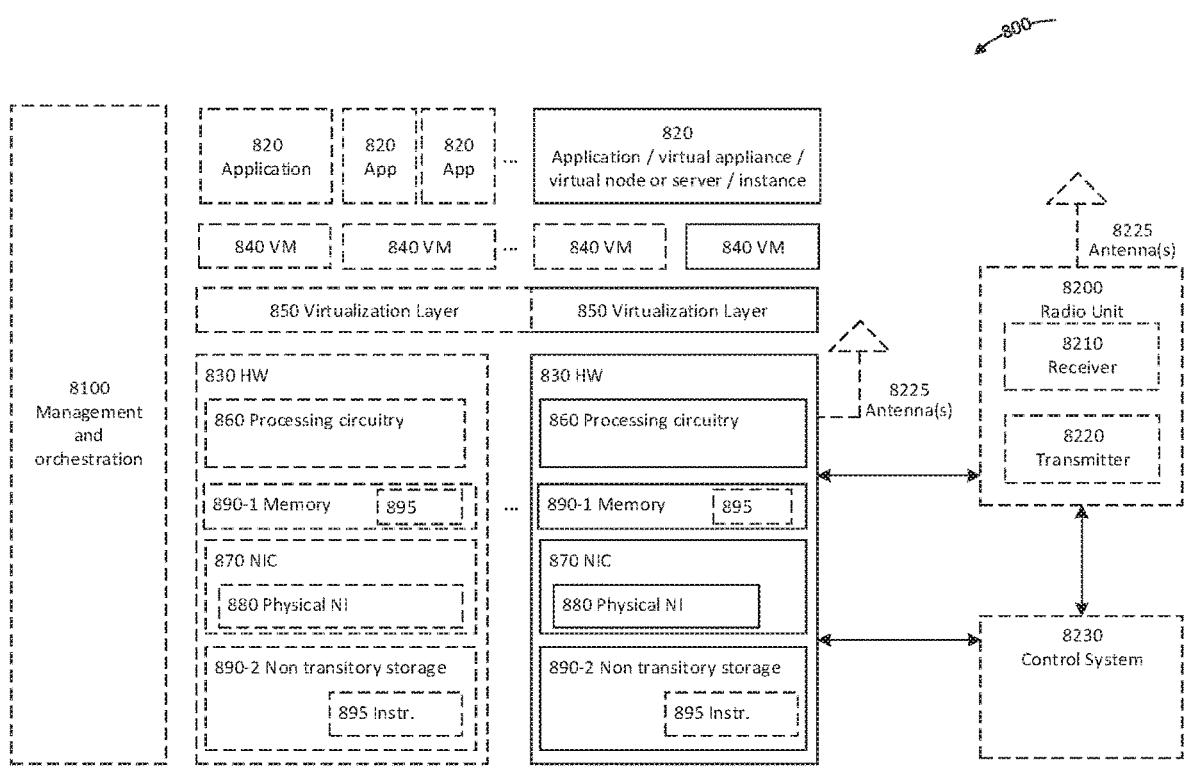
FIG. 8 is a schematic showing a virtualization environment in accordance with some embodiments.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
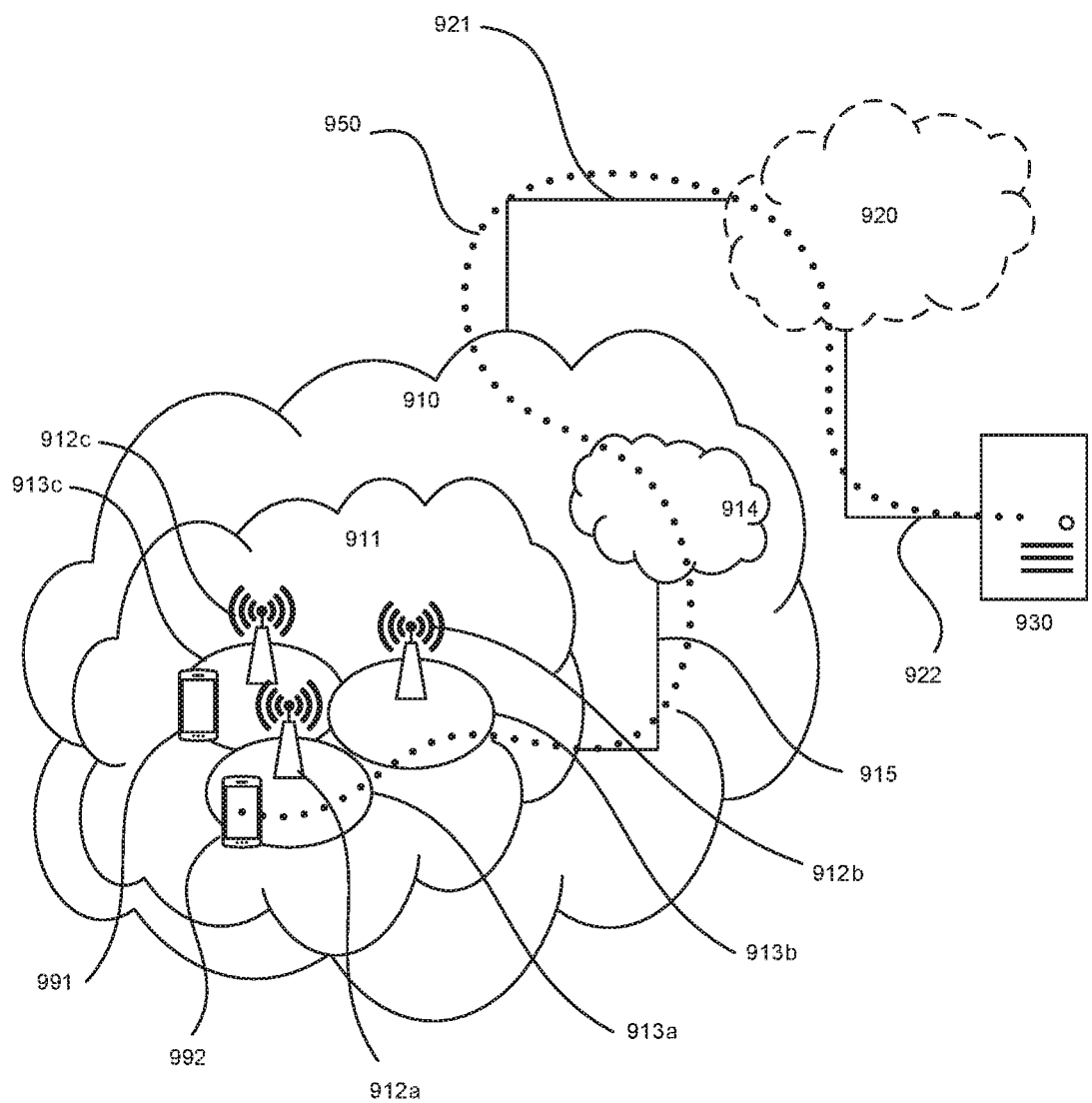
FIG. 9 is a schematic showing a telecommunication network connected via an intermediate network to a host computer in accordance with some embodiments.

FIG. 9 is a schematic showing a telecommunication network connected via an intermediate network to a host computer in accordance with some embodiments. With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more subnetworks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Figure 10:
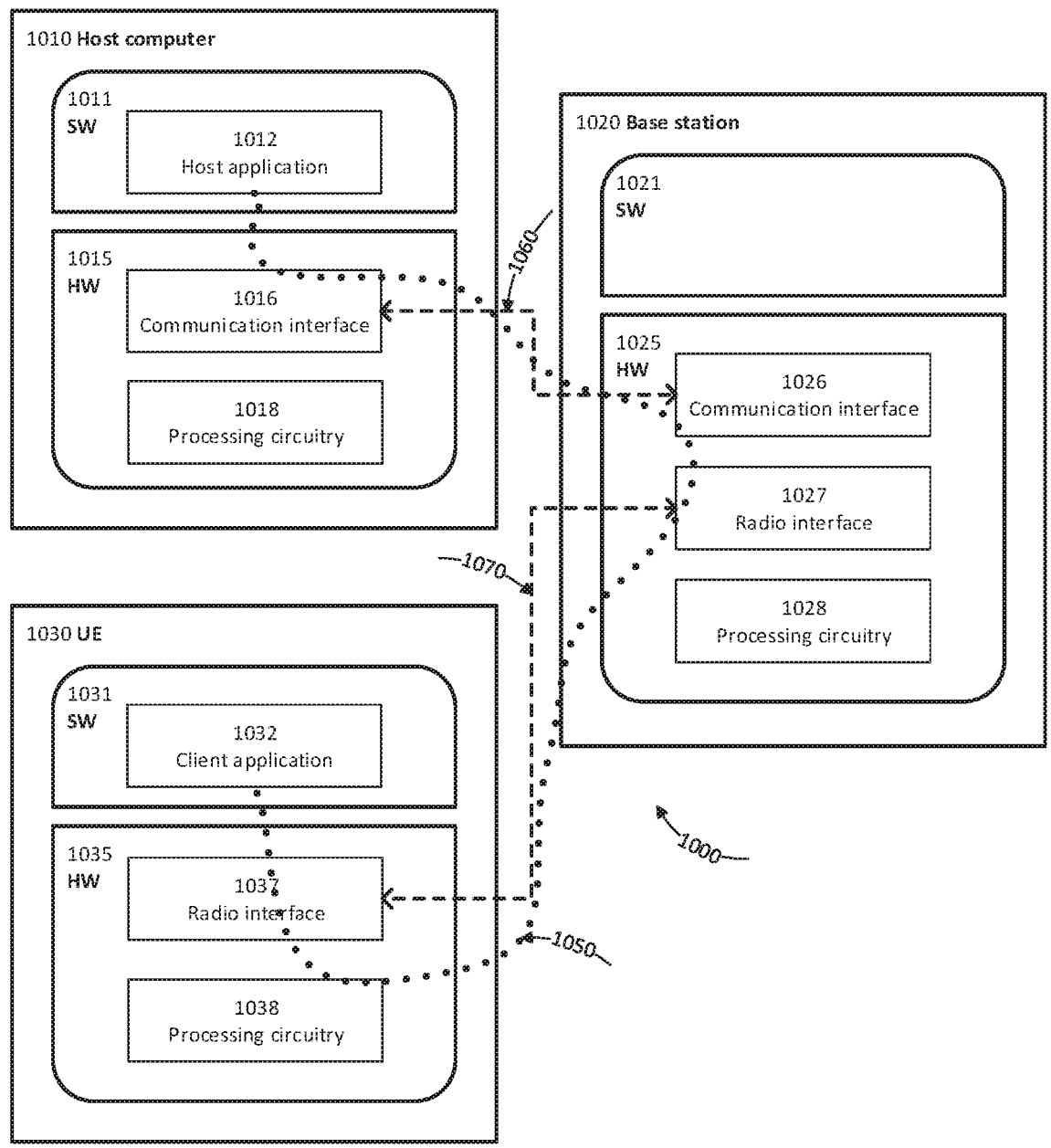
FIG. 10 is a schematic showing a host computer communicating via a base station with a user equipment over a partially wireless connection in accordance with some embodiments.

FIG. 10 is a schematic showing a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the data rate, latency, power consumption, since interruptions during switch of BWPs are reduced, and thereby provide benefits such as, reduced user waiting time, better responsiveness. The energy improvement in node equipment and in network level can also be calculated/estimated for the present disclosure.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
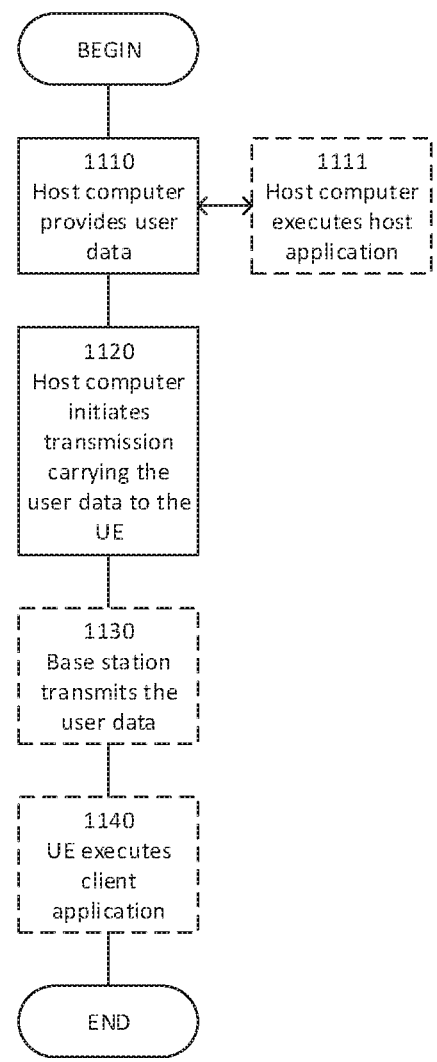
FIG. 11 is a schematic showing methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
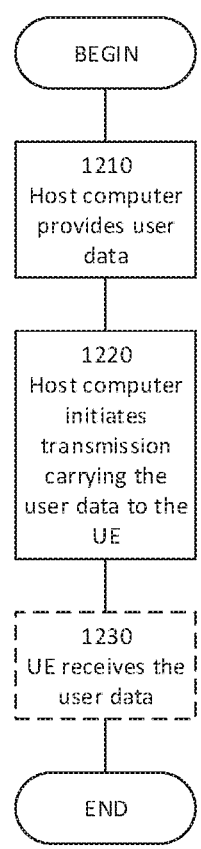
FIG. 12 is a schematic showing methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
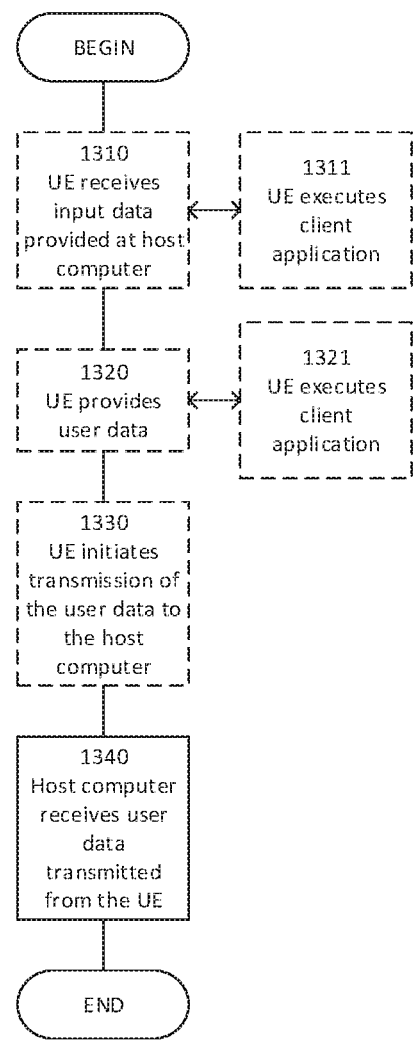
FIG. 13 is a schematic showing methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
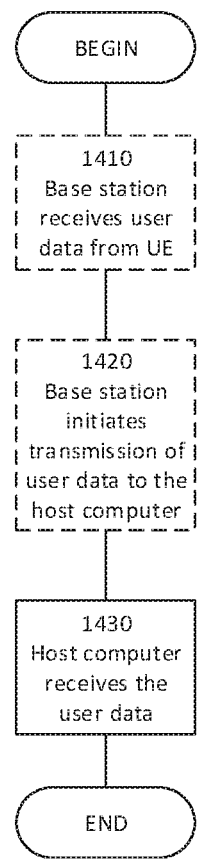
FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
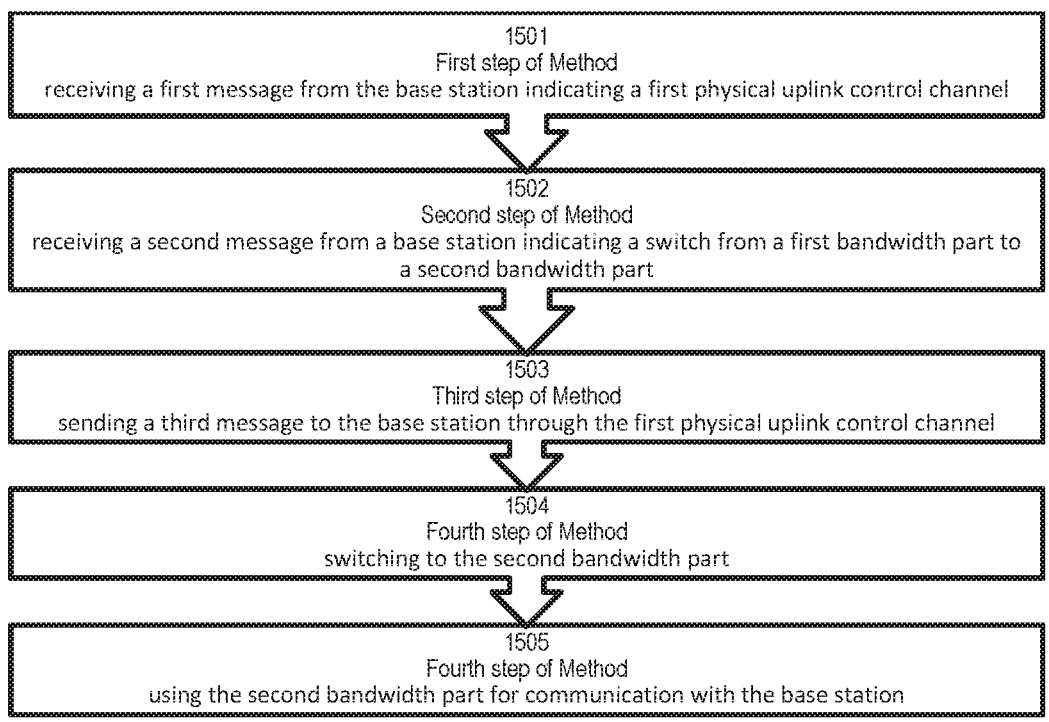
FIG. 15 is a schematic showing method performed by a wireless device in accordance with some embodiments.

FIG. 15 depicts a method performed by a wireless device in accordance with particular embodiments, the method begins at step 1501 with receiving a first message from the base station indicating a first physical uplink control channel. Then, in step 1502, the wireless device receives a second message from a base station indicating switching from a first bandwidth part to a second bandwidth part. Optionally, in step 1503, in response to the second message, the wireless device utilizes the first physical uplink control channel, for preparing the switching. Specifically, the wireless device may send a third message to the base station through the first physical uplink control channel. The third message comprises at least one of a scheduling request, a hybrid automatic repeat request acknowledge/negative acknowledge, and a channel station information. In step 1504, the wireless device switches to the second bandwidth part. In step 1505, the wireless device uses the second bandwidth part for communication with the base station.

Figure 16:
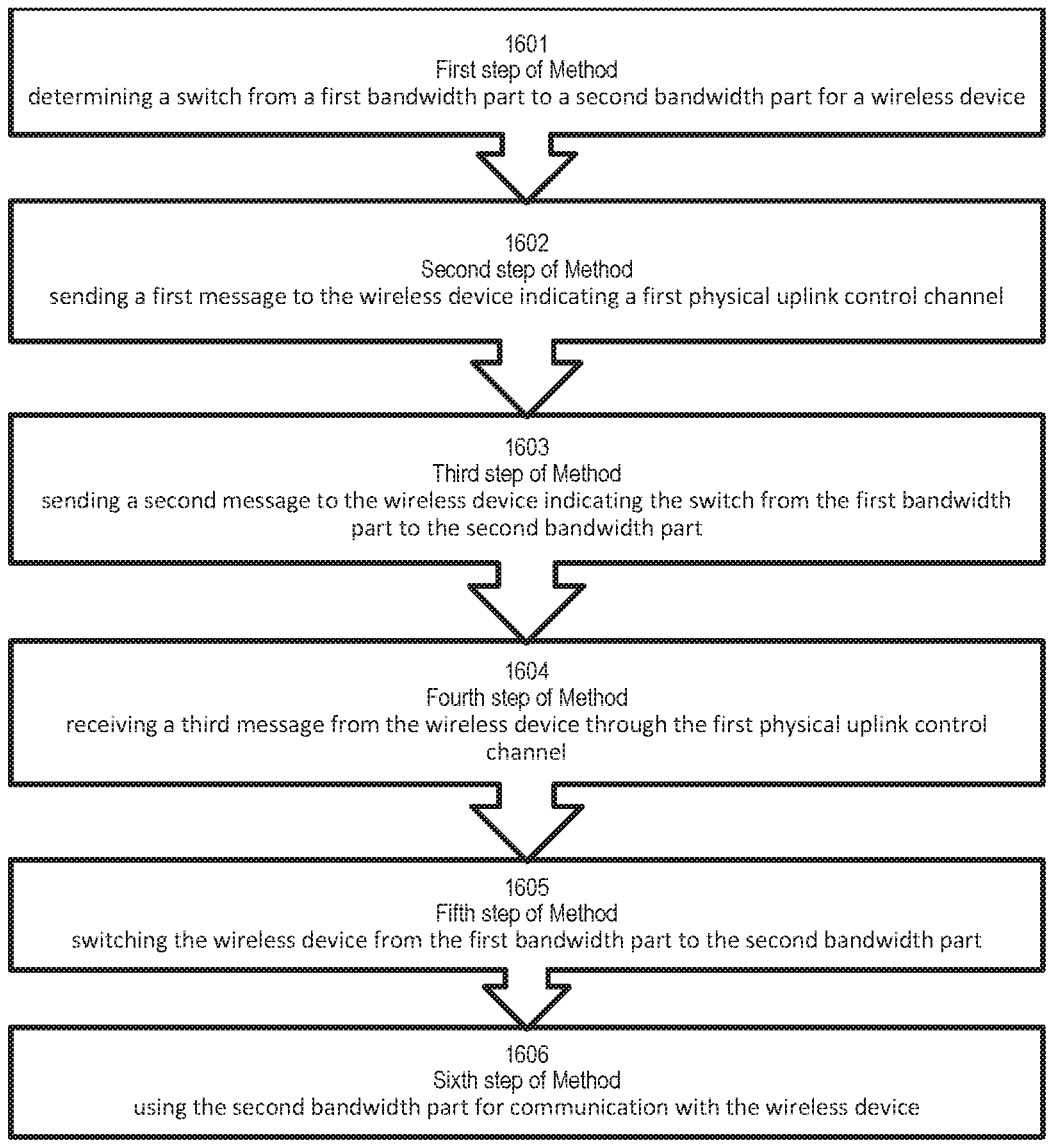
FIG. 16 is a schematic showing method performed by a base station in accordance with some embodiments.

FIG. 16 depicts a method in accordance with particular embodiments, the method begins at step 1601 with determining switching from a first bandwidth part to a second bandwidth part for a wireless device. Then in step 1602, the base station sends a first message to the wireless device indicating a first physical uplink control channel In step 1603, the base station sends a second message to the wireless device indicating the switch from the first bandwidth part to the second bandwidth part. Optionally, in step 1604, the base station utilizes the first physical uplink control channel, for preparing the switching. Specifically, the base station receives a third message from the wireless device through the first physical uplink control channel. In step 1605, the base station switches the wireless device from the first bandwidth part to the second bandwidth part. In step 1606, the base station uses the second bandwidth part for communication with the wireless device.

Figure 17:
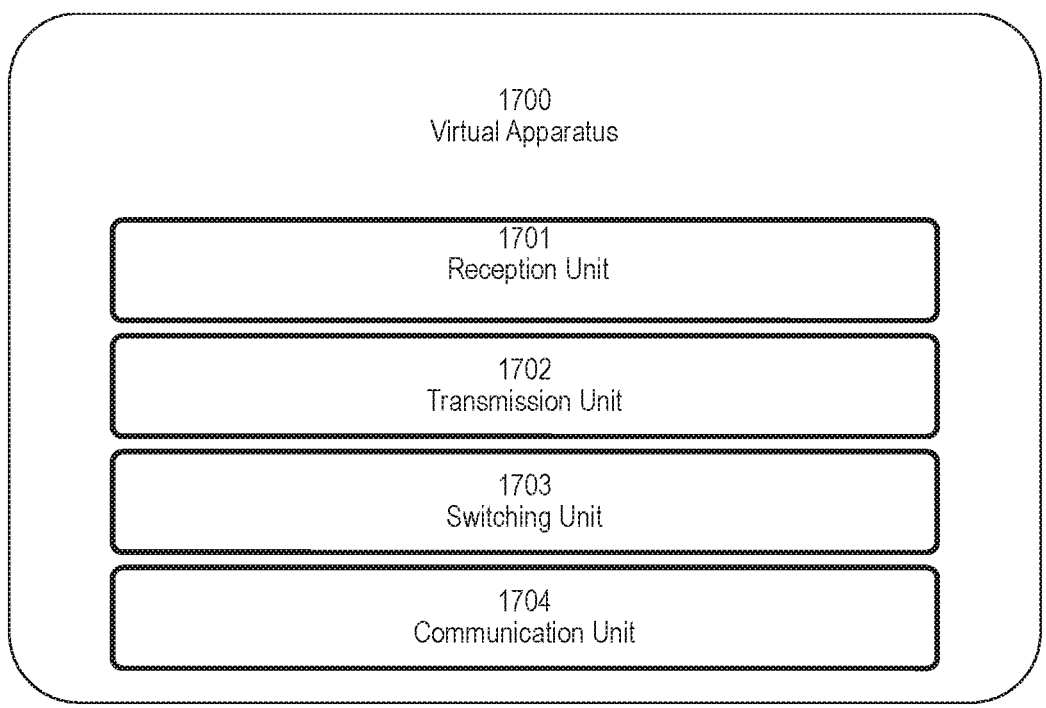
FIG. 17 is a schematic showing virtualization apparatus in a wireless device in accordance with some embodiments.

FIG. 17 illustrates a schematic block diagram of an apparatus 1700 in a wireless network (for example, the wireless network shown in FIG. 6). The apparatus may be implemented in a wireless device (e.g., wireless device 610 shown in FIG. 6). Apparatus 1700 is operable to carry out the example method described with reference to FIG. 15 and possibly any other processes or methods disclosed herein. It is also to be understood that the method of FIG. 15 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a reception unit 1701, a transmission unit 1702, switching unit 1703 and a communication unit 1704, and any other suitable units of apparatus 1700 to perform corresponding functions according one or more embodiments of the present disclosure.

As illustrated in FIG. 17, apparatus 1700 includes the reception unit 1701, the transmission unit 1702, the switching unit 1703 and the communication unit 1704.

The reception unit 1701 is configured to receive a first message from the base station indicating a first physical uplink control channel, and further configured to receive a second message from a base station indicating switching from a first bandwidth part to a second bandwidth part. The transmission unit 1702 is configured to send a third message to the base station through the first physical uplink control channel. The third message comprises at least one of a scheduling request, a hybrid automatic repeat request acknowledge/negative acknowledge, and a channel station information. The switching unit 1703 is configured to switch to the second bandwidth part. The communication unit 1704 is configured to use the second bandwidth part for communication with the base station.

The communication unit 1704 may be an independent unit for data communication. Alternatively, the reception unit 1701 and the transmission unit 1702 are reused as the communication unit 1704 for data communication.

The apparatus may be implemented in a network node (e.g., network node 660 shown in FIG. 6). Apparatus 1800 is operable to carry out the example method described with reference to FIG. 16 and possibly any other processes or methods disclosed herein. It is also to be understood that the method of FIG. 16 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a determination unit 1801, a transmission unit 1802, a reception unit 1803, switching unit 1804, and a communication unit 1805, and any other suitable units of apparatus 1800 to perform corresponding functions according one or more embodiments of the present disclosure.

Figure 18:
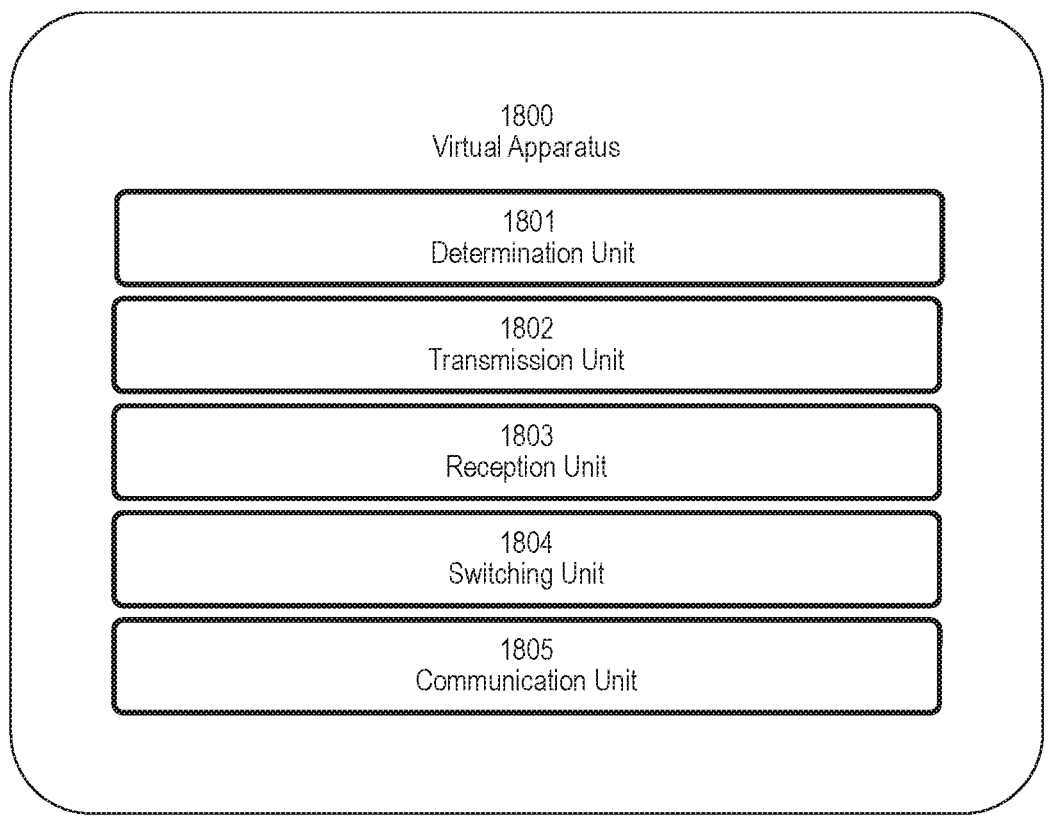
FIG. 18 is a schematic showing virtualization apparatus in a base station in accordance with some embodiments.

As illustrated in FIG. 18, apparatus 1800 includes the determination unit 1801, the transmission unit 1802, the reception unit 1803, the switching unit 1804, and the communication unit 1805. The determination unit 1801 is configured to determining switching from a first bandwidth part to a second bandwidth part for a wireless device. The transmission unit 1802 is configured to send a first message to the wireless device indicating a first physical uplink control channel; and is further configured to sending a second message to the wireless device indicating the switch from the first bandwidth part to the second bandwidth part. The reception unit 1803 is configured to receive a third message from the wireless device through the first physical uplink control channel. The switching unit 1804 is configured to switch the wireless device from the first bandwidth part to the second bandwidth part, or just accept the switch of wireless device. The communication unit 1805 is configured to use the second bandwidth part for communication with the wireless device.

The communication unit 1805 may be an independent unit for data communication. Alternatively, the transmission unit 1801 and the reception unit 1802 are reused as the communication unit 1805 for data communication.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some embodiments of the present disclosure may provide a communication system including a host computer comprising: processing circuitry configured to provide user data; and a communication interface configured to forward the user data to a cellular network for transmission to a user equipment (UE). The cellular network comprises a base station having a radio interface and processing circuitry. The base station's processing circuitry is configured to perform any of the steps of the above mentioned methods.

In embodiments of the present disclosure, the communication system may further include the base station.

In embodiments of the present disclosure, the communication system may further include the UE. The UE is configured to communicate with the base station.

In embodiments of the present disclosure, the processing circuitry of the host computer is configured to execute a host application, thereby providing the user data. The UE comprises processing circuitry configured to execute a client application associated with the host application.

Some embodiments of the present disclosure may provide a method implemented in a communication system including a host computer, a base station and a user equipment (UE). The method comprises: at the host computer, providing user data; and at the host computer, initiating a transmission carrying the user data to the UE via a cellular network comprising the base station, wherein the base station performs any of the steps of any of the methods above mentioned.

In embodiments of the present disclosure, the method may further comprise: at the base station, transmitting the user data.

In embodiments of the present disclosure, the user data may be provided at the host computer by executing a host application, the method further comprises: at the UE, executing a client application associated with the host application.

In embodiments of the present disclosure, the user equipment (UE) may be configured to communicate with the base station and the UE may comprise a radio interface and processing circuitry configured to performs the previous methods.

Some embodiments of the present disclosure may provide a communication system including a host computer comprising: communication interface configured to receive user data originating from a transmission from a user equipment (UE) to a base station. The UE comprises a radio interface and processing circuitry. The UE's processing circuitry is configured to perform any of the steps of any of the methods above mentioned.

In embodiments of the present disclosure, the communication system may further include the UE.

In embodiments of the present disclosure, the communication system may further include the base station. The base station comprises a radio interface configured to communicate with the UE and a communication interface configured to forward to the host computer the user data carried by a transmission from the UE to the base station.

In embodiments of the present disclosure, the processing circuitry of the host computer may be configured to execute a host application; and the UE's processing circuitry is configured to execute a client application associated with the host application, thereby providing the user data.

In embodiments of the present disclosure, the processing circuitry of the host computer may be configured to execute a host application, thereby providing request data; and the UE's processing circuitry is configured to execute a client application associated with the host application, thereby providing the user data.

Some embodiments of the present disclosure may provide a method implemented in a communication system including a host computer, a base station and a user equipment (UE). The method comprises: at the host computer, receiving user data transmitted to the base station from the UE, wherein the UE performs any of the steps of any of the methods above mentioned.

In embodiments of the present disclosure, the method may further comprise: at the UE, providing the user data to the base station.

In embodiments of the present disclosure, the method may further comprise: at the UE, executing a client application, thereby providing the user data to be transmitted; and at the host computer, executing a host application associated with the client application.

In embodiments of the present disclosure, the method may further comprise: at the UE, executing a client application; and at the UE, receiving input data to the client application, the input data being provided at the host computer by executing a host application associated with the client application. The user data to be transmitted is provided by the client application in response to the input data.

Some embodiments of the present disclosure may provide a method implemented in a communication system including a host computer, a base station and a user equipment (UE). The method comprises: at the host computer, receiving, from the base station, user data originating from a transmission which the base station has received from the UE, wherein the UE performs any of the steps of any of the methods above mentioned.

In embodiments of the present disclosure, the method may further comprise: at the base station, receiving the user data from the UE.

In embodiments of the present disclosure, the method may further comprise: at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
1-DD Frequency Division Duplex
1-1-S For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
CORESET Control-resource set
HARQ A/N Hybrid Automatic Repeat Request Acknowledge/Negative acknowledge
DCI Downlink Control Information

The invention claimed is:
1. A method performed by a wireless device for switching of bandwidth parts, the method comprising:
receiving a first message from a base station indicating a first physical uplink control channel;
receiving a second message from the base station indicating switching from a first bandwidth part to a second bandwidth part; and
in response to the second message, sending a third message to the base station via the indicated first physical uplink control channel to prepare for switching to the second bandwidth part for communication with the base station.

2. The method of claim 1, wherein:
the third message comprises at least one of the following: a scheduling request, a hybrid automatic repeat request acknowledge/negative acknowledge, and a channel state information.

3. The method of claim 1, wherein:
the first physical uplink control channel is allocated within a third bandwidth part; and
the method further comprises receiving a fourth message from the base station indicating a second physical uplink control channel allocated within the second bandwidth part.

4. The method of claim 3, wherein the third bandwidth part is further configured for a random access channel for the wireless device.

5. The method of claim 3, wherein the third bandwidth part is further configured for a physical downlink control channel.

6. The method of claim 3, further comprising:
receiving a fifth message from the base station comprising a value of a timer, which indicates a usage time of the first physical uplink control channel; and
stopping using the first physical uplink control channel, in response to an expiration of the timer.

7. The method of claim 6, further comprising sending a sixth message reporting the stopping of using the first physical uplink control channel.

8. The method of claim 1, wherein the first physical uplink control channel is allocated within the second bandwidth part.

9. The method of claim 8, wherein:
a logical channel of the wireless device is mapped to:
a physical uplink control channel within the first bandwidth part, and
the first physical uplink control channel within the second bandwidth part; and
sending the third message to the base station via the first physical uplink control channel is performed without remapping the logical channel.

10. The method of claim 9, wherein the logical channel of the wireless device is mapped to a plurality of physical uplink control channels respectively allocated in a plurality of bandwidth parts.

11. The method of claim 8, wherein:
a logical channel of the wireless device is mapped to a physical uplink control channel within the first bandwidth part; and
the method further comprises remapping the logical channel to the first physical uplink control channel within the second bandwidth part.

12. The method of claim 1, wherein the first message comprises at least one of a radio resource control signaling, a medium access control element, and a physical downlink control channel order.

13. The method of claim 1, further comprising sending a seventh message to the base station confirming the result of the switch of bandwidth part.

14. The method of claim 1, further comprising receiving an eighth message indicating a time point or a time period to send the third message.

15. The method of claim 1, wherein the third message is sent after performing a radio frequency tuning.

16. The method of claim 1, further comprising sending a ninth message to the base station for requiring the switch of bandwidth part.

17. A method performed by a base station for switching of bandwidth parts, the method comprising:
determining switching from a first bandwidth part to a second bandwidth part for a wireless device;
sending a first message to the wireless device indicating a first physical uplink control channel;
sending a second message to the wireless device indicating the switch from the first bandwidth part to the second bandwidth part;
switching the wireless device from the first bandwidth part to the second bandwidth part for communication with the wireless device, based on receiving a third message, responsive to the second message, from the wireless device through the first physical uplink control channel.

18. The method of claim 17, wherein
the third message comprises at least one of the following: a scheduling request, a hybrid automatic repeat request acknowledge/negative acknowledge, and a channel state information.

19. The method of claim 17, wherein:
the first physical uplink control channel is allocated within a third bandwidth part; and
the method further comprises sending a fourth message to the wireless device indicating a second physical uplink control channel allocated within the second bandwidth part.

20. A wireless device configured for switching of bandwidth parts, the wireless device comprising processing circuitry configured to:
receive a first message from a base station indicating a first physical uplink control channel;
receive a second message from the base station indicating switching from a first bandwidth part to a second bandwidth part; and
in response to the second message, send a third message to the base station via the indicated first physical uplink control channel to prepare for switching to the second bandwidth part for communication with the base station.

* * * * *